US011248940B2

(12) United States Patent
Rud et al.

(10) Patent No.: US 11,248,940 B2
(45) Date of Patent: Feb. 15, 2022

(54) NON-INVASIVE PROCESS FLUID FLOW INDICATION USING TEMPERATURE DIFFERENCE

(71) Applicant: Rosemount Inc., Shakopee, MN (US)

(72) Inventors: Jason H. Rud, Chanhassen, MN (US); Zachery A. Lewis, Rochester, MN (US)

(73) Assignee: Rosemount Inc., Shakopee, MN (US)

( * ) Notice: Subject to any disclaimer, the term of this patent is extended or adjusted under 35 U.S.C. 154(b) by 124 days.

(21) Appl. No.: 16/722,276

(22) Filed: Dec. 20, 2019

(65) Prior Publication Data
US 2021/0190562 A1     Jun. 24, 2021

(51) Int. Cl.
| | |
|---|---|
| *G01F 1/684* | (2006.01) |
| *G01F 1/696* | (2006.01) |
| *G01P 13/00* | (2006.01) |
| *G01F 1/00* | (2006.01) |

(52) U.S. Cl.
CPC ............ *G01F 1/6847* (2013.01); *G01F 1/696* (2013.01)

(58) Field of Classification Search
CPC ...... G01F 1/6847; G01F 1/696; G01F 1/6965; G01F 1/002; G01P 13/00
See application file for complete search history.

(56) References Cited

U.S. PATENT DOCUMENTS

| | | | |
|---|---|---|---|
| 2015/0185085 A1* | 7/2015 | Converse | G01K 1/143 374/44 |
| 2018/0238747 A1 | 8/2018 | Choi et al. | |
| 2018/0231409 A1 | 9/2018 | Ilgner | |
| 2020/0096397 A1 | 3/2020 | Rud | |
| 2020/0103287 A1 | 4/2020 | Rud et al. | |
| 2020/0103293 A1 | 4/2020 | Rud | |

OTHER PUBLICATIONS

International Search Report and Written Opinion for International Patent Appiciation No. PCT/US2020/063599, dated Mar. 15, 2021, 10 pages.

\* cited by examiner

*Primary Examiner* — Peter J Macchiarolo
*Assistant Examiner* — Anthony W Megna Fuentes
(74) *Attorney, Agent, or Firm* — Christopher R. Christenson; Kelly, Holt & Christenson, PLLC

(57) ABSTRACT

A process fluid flow system includes a first pipe skin sensor and a second pipe skin sensor. The first pipe skin sensor is disposed to measure an external temperature of a process fluid conduit at a first location on the process fluid conduit. The second pipe skin sensor is disposed to measure an external temperature of a process fluid conduit at a second location on the process fluid conduit. Measurement circuitry is coupled to the first and second pipe skin sensors. A controller is coupled to the measurement circuitry and is configured to identify a process fluid flow condition based on signals from the first and second pipe skin sensors and to output an indication of the process fluid flow condition.

24 Claims, 5 Drawing Sheets

NON-INVASIVE PROCESS FLUID FLOW INDICATION USING TEMPERATURE DIFFERENCE

BACKGROUND

Many industrial processes convey process fluids through pipes or other conduits. Such process fluids can include liquids, gasses, and sometimes entrained solids. These process fluid flows may be found in any of a variety of industries including, without limitation, hygienic food and beverage production, water treatment, high-purity pharmaceutical manufacturing, chemical processing, the hydrocarbon fuel industry, including hydrocarbon extraction and processing as well as hydraulic fracturing techniques utilizing abrasive and corrosive slurries.

Measuring a process fluid characteristic such as pressure, flow rate, or temperature, generally requires the use of a measuring instrument that extends into the process fluid. This extension of a measuring instrument into the process fluid is an invasive measurement in that it requires the process fluid conduit to have an aperture through which the measuring instrument passes. Further, the aperture must be sealed so that the process fluid does not leak or otherwise escape. Further still, measuring instruments that are exposed to the process fluid can be worn or damaged by high velocity process fluid that, in some instance, can be very abrasive.

SUMMARY

A process fluid flow system includes a first pipe skin sensor and a second pipe skin sensor. The first pipe skin sensor is disposed to measure an external temperature of a process fluid conduit at a first location on the process fluid conduit. The second pipe skin sensor is disposed to measure an external temperature of a process fluid conduit at a second location on the process fluid conduit. Measurement circuitry is coupled to the first and second pipe skin sensors. A controller is coupled to the measurement circuitry and is configured to identify a process fluid flow condition based on signals from the first and second pipe skin sensors and to output an indication of the process fluid flow condition.

DETAILED DESCRIPTION

Figure 1:
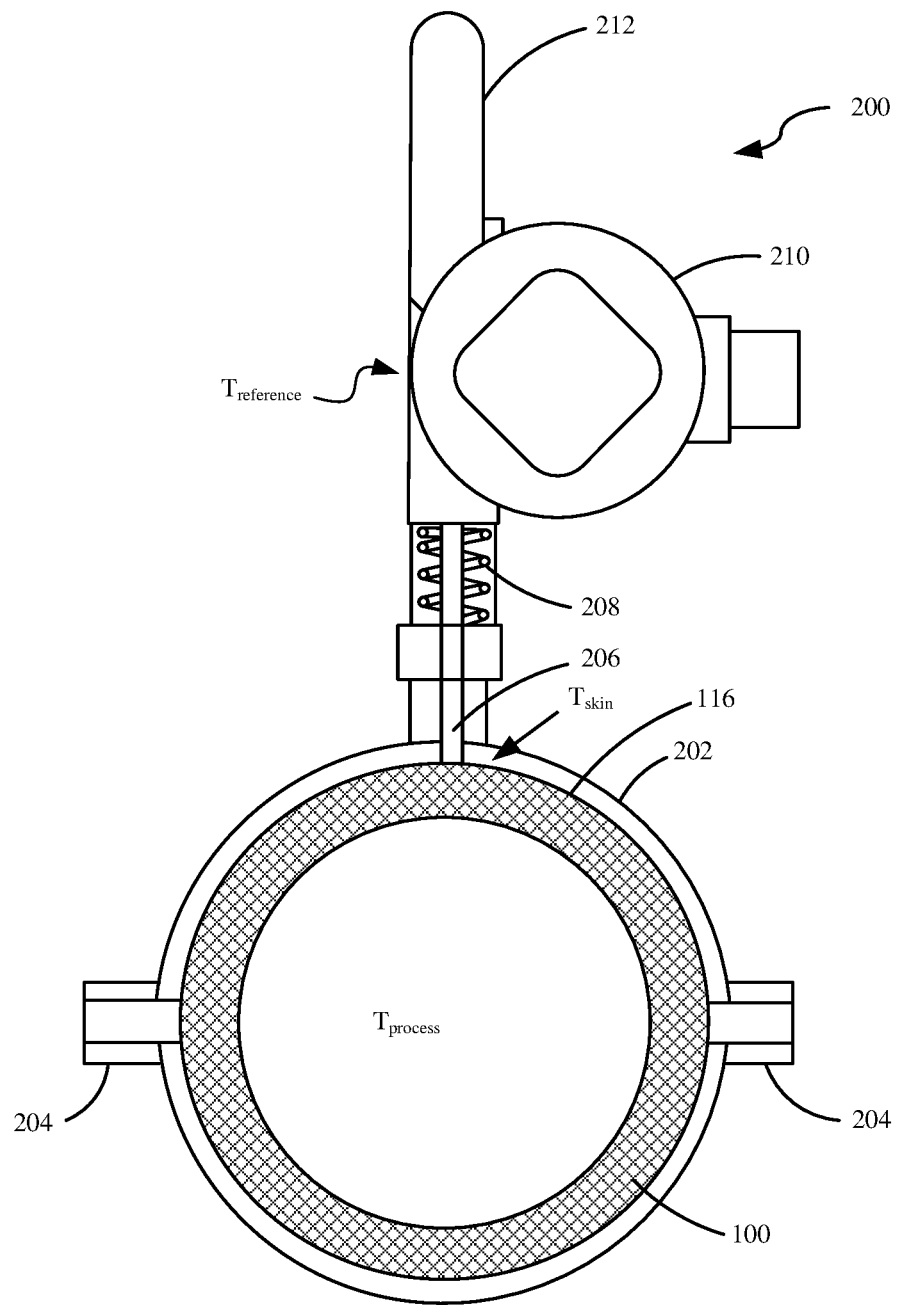
FIG. 1 is a diagrammatic view of a heat flow measurement system with which embodiments of the present invention are particularly applicable.

Embodiments disclosed herein generally provide important process fluid information without requiring a measurement instrument or sensor to pass through a process fluid conduit. Thus, embodiments described herein are generally considered non-invasive in that they do not breach the process. However, based on a plurality of temperature measurements on an external surface of the process fluid conduit, important process fluid parameters can be determined and provided. Examples, include an indication of whether the process fluid is flowing in the conduit and, to some extent, the flow conditions within the process fluid conduit. Further, this process fluid flow information can be provided to a heat flow calculation or other suitable calculation in order to provide an estimate of process fluid temperature within the conduit that is adjusted or otherwise compensated for the determined process fluid flow. While much of the description provided below will focus on this synergy, it is expressly contemplated that embodiments described herein can be practiced by simply providing an indication of process fluid flow based on a plurality of external temperature measurements.

It is common to place a temperature sensor within a thermowell, which is then inserted into the process fluid flow through an aperture in the conduit. However, this approach may not always be practical as described above. Additionally, thermowells generally require a threaded port or other robust mechanical mount/seal in the conduit and thus, must be designed into the process fluid flow system at a defined location. Accordingly, thermowells, while useful for providing accurate process fluid temperatures, have a number or limitations.

More recently, process fluid temperature has been estimated by measuring an external temperature of a process fluid conduit, such as a pipe, and employing a heat flow calculation. This external approach is considered non-invasive because it does not require any aperture or port to be defined in the conduit. Accordingly, such non-intrusive approaches can be deployed at virtually any location along the conduit.

As set forth above, process fluid temperatures can be estimated by measuring an external temperature of a process fluid conduit, such as a pipe, and employing a heat flow calculation. Such systems generally use the pipe skin (external surface) temperature $T_{skin}$ and a reference temperature $T_{reference}$ and thermal impedance values (relative to the pipe wall and relative to the thermal relationship between the pipe skin location and the reference temperature measurement location) in the heat flow calculation to infer or otherwise estimate the process fluid temperature within the conduit. As the process fluid temperature changes (e.g. rises or falls), the temperature profile of the system will change. This temperature difference between the pipe skin temperature and the reference temperature is a result of heat flowing between the two locations. Coupled with knowledge of the thermal impedance (or other similar constant related to heat flow) between the two locations, the temperature on the inside surface of the process fluid conduit can be estimated. Since the inside surface of the process fluid conduit is in direct contact with the process fluid, this inside surface temperature can be used to estimate the temperature of the process fluid.

The process fluid temperature estimation described above generally relies upon the assumption that the temperature of the inside surface of the conduit is indicative of the entire process fluid cross-section flowing through the conduit. While this assumption is generally accurate for turbulent process fluid flowing through a filled conduit, there are some process fluid flow conditions where the assumption is not as accurate. For example, if the process fluid flow is laminar or partially turbulent, then the assumption is not as correct and the process fluid temperature estimation accuracy could be reduced. Further, if the process fluid conduit is not completely full, or if the process fluid is not flowing through the conduit, the temperature estimation accuracy can also be affected.

FIG. 1 is a diagrammatic view of a process fluid temperature estimation system with which embodiments of the present invention are particularly applicable. As illustrated, system 200 generally includes a pipe clamp portion 202 that is configured to clamp around conduit or pipe 100. Pipe clamp 202 may have one or more clamp ears 204 in order to allow the clamp portion 202 to be positioned and clamped to pipe 100. Pipe clamp 202 may replace one of clamp ears 204 with a hinge portion such that pipe clamp 202 can be opened to be positioned on a pipe and then closed and secured by clamp ear 204. While the clamp illustrated with respect to FIG. 1 is particularly useful, any suitable mechanical arrangement for securely positioning system 200 about an exterior surface of a pipe can be used in accordance with embodiments described herein.

System 200 includes heat flow sensor capsule 206 or a suitable surface sensor that is urged against external diameter 116 of pipe 100 by spring 208. The term "capsule" is not intended to imply any particular structure or shape and can thus be formed in a variety of shapes, sizes and configurations. While spring 208 is illustrated, those skilled in the art will appreciate that various techniques can be used to urge sensor capsule 206 into continuous contact with external diameter 116. Sensor capsule 206 generally includes one or more temperature sensitive elements, such as resistance temperature devices (RTDs) or thermocouples. Sensors within capsule 206 are electrically connected to transmitter circuitry within housing 210, which is configured to obtain one or more temperature measurements from sensor capsule 206 and calculate an estimate of the process fluid temperature based on the measurements from sensor capsule 206, and a reference temperature, such as a temperature measured within housing 210, or otherwise provided to circuitry within housing 210.

In one example, the basic heat flow calculation can be simplified into:

$$T_{corrected} = T_{skin} + (T_{skin} - T_{reference}) * (R_{pipe}/R_{sensor}).$$

In this equation, $T_{skin}$ is the measured temperature of the external surface of the conduit. Additionally, $T_{reference}$ is a second temperature obtained relative to a location having a thermal impedance ($R_{sensor}$) from the temperature sensor that measures $T_{skin}$. $T_{reference}$ is typically sensed by a dedicated temperature sensor within housing 210. However, $T_{reference}$ can be sensed or inferred in other ways as well. For example, a temperature sensor can be positioned external to the transmitter to replace the terminal temperature measurement in the heat transfer calculation. This external sensor would measure the temperature of the environment surrounding the transmitter. As another example, industrial electronics typically have onboard temperature measurement capabilities. This electronics temperature measurement can be used as a substitute to the terminal temperature for the heat transfer calculation. As another example, if the thermal conductivity of the system is known and the ambient temperature around the transmitter is fixed or user controlled, the fixed or user controllable temperature can be used as the reference temperature.

$R_{pipe}$ is the thermal impedance of the conduit and can be obtained manually by obtaining pipe material information, pipe wall thickness information, etc. Additionally, or alternately, a parameter related to $R_{pipe}$ can be determined during a calibration or calculated and stored for subsequent use. Accordingly, using a suitable heat flux calculation, such as that described above, circuitry within housing 210 is able to calculate an estimate for the process fluid temperature ($T_{corrected}$) and convey an indication regarding such process fluid temperature to suitable devices and/or a control room. In the example illustrated in FIG. 1, such information may be conveyed wirelessly via antenna 212.

Figure 2:
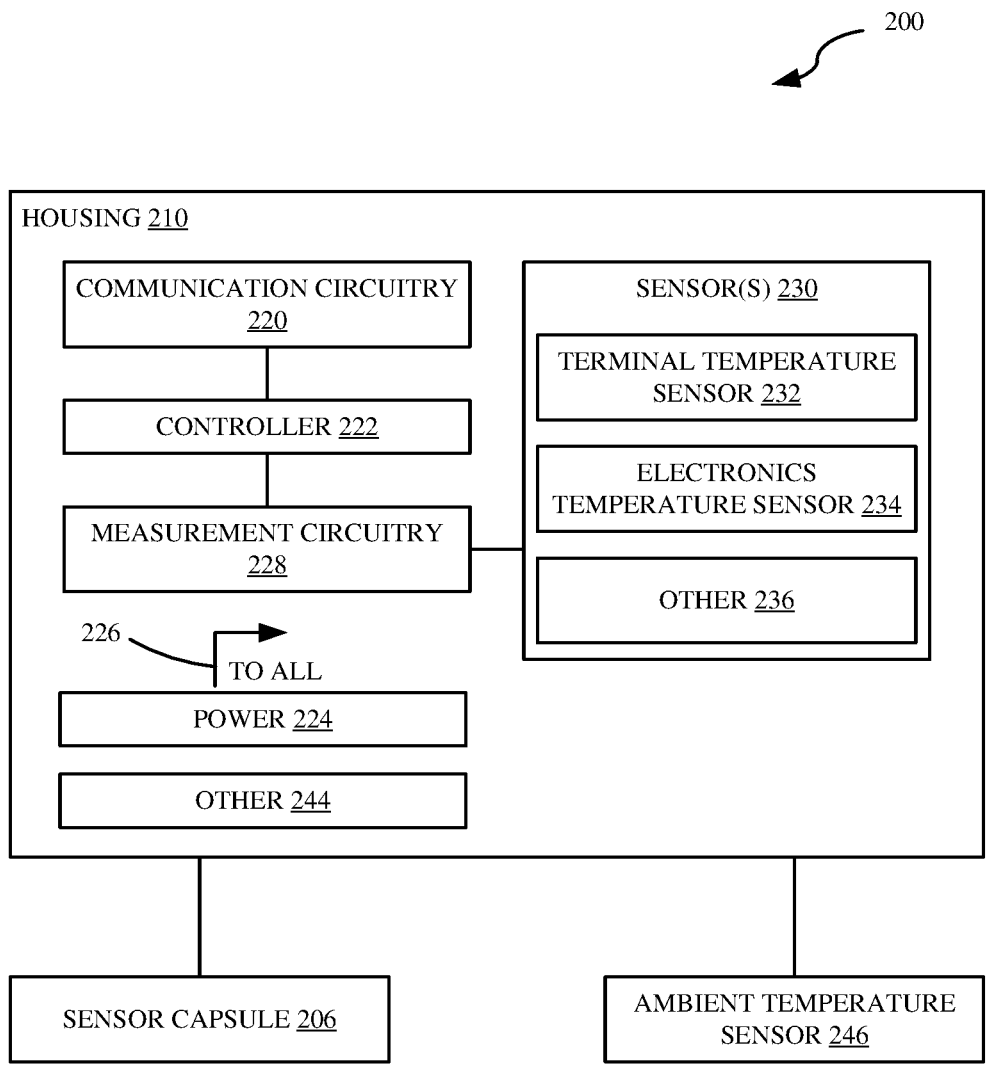
FIG. 2 is diagrammatic view of a process fluid temperature estimation system with which embodiments of the present invention are particularly applicable.

FIG. 2 is a block diagram of circuitry within housing 210 of heat flow measurement system 200, with which embodiments of the present invention are particularly applicable. System 200 includes communication circuitry 220 coupled to controller 222. Communication circuitry 220 can be any suitable circuitry that is able to convey information regarding the estimated process fluid temperature. Communication circuitry 220 allows heat flow measurement system 200 to communicate the process fluid temperature output over a process communication loop or segment. Suitable examples of process communication loop protocols include the 4-20 milliamp protocol, Highway Addressable Remote Transducer (HART®) protocol, FOUNDATION™ Fieldbus Protocol, and the WirelessHART protocol (IEC 62591).

Heat flow measurement system 200 also includes power supply module 224 that provides power to all components of system 200 as indicated by arrow 226. In embodiments where heat flow measurement system 200 is coupled to a wired process communication loop, such as a HART® loop, or a FOUNDATION™ Fieldbus segment, power module 224 may include suitable circuitry to condition power received from the loop or segment to operate the various components of system 200. Accordingly, in such wired process communication loop embodiments, power supply module 224 may provide suitable power conditioning to allow the entire device to be powered by the loop to which it is coupled. In other embodiments, when wireless process communication is used, power supply module 224 may include a source of power, such as a battery and suitable conditioning circuitry.

Controller 222 includes any suitable arrangement that is able to generate a heat-flow based process fluid temperature estimate using measurements from sensor(s) within capsule 206 and an additional reference temperature, such as a terminal temperature within housing 210. In one example, controller 222 is a microprocessor. Controller 222 is communicatively coupled to communication circuitry 220.

Measurement circuitry 228 is coupled to controller 222 and provides digital indications with respect to measurements obtained from one or more temperature sensors 230. Measurement circuitry 228 can include one or more analog-to-digital converters and/or suitable multi-plexing circuitry to interface the one or more analog-to-digital converters to temperature sensors 230. Additionally, measurement circuitry 228 can include suitable amplification and/or linearization circuitry as may be appropriate for the various types of temperature sensors employed.

Temperature sensors 230 illustratively include terminal temperature sensor 232, electronics temperature sensor 234 and can include other items as well, as indicated by block 236. Electronics temperature sensor 234 is coupled to the electronic circuitry of system 200 and is used to determine the temperature of the electronics. Typically, electronics temperature sensor 234 is used to protect the electronic circuitry from overheating. For example, when the electronics reach a certain temperature, a fan is turned on to reduce that temperature. In one embodiment, electronics temperature sensor 234 senses the reference temperature.

Figure 3:
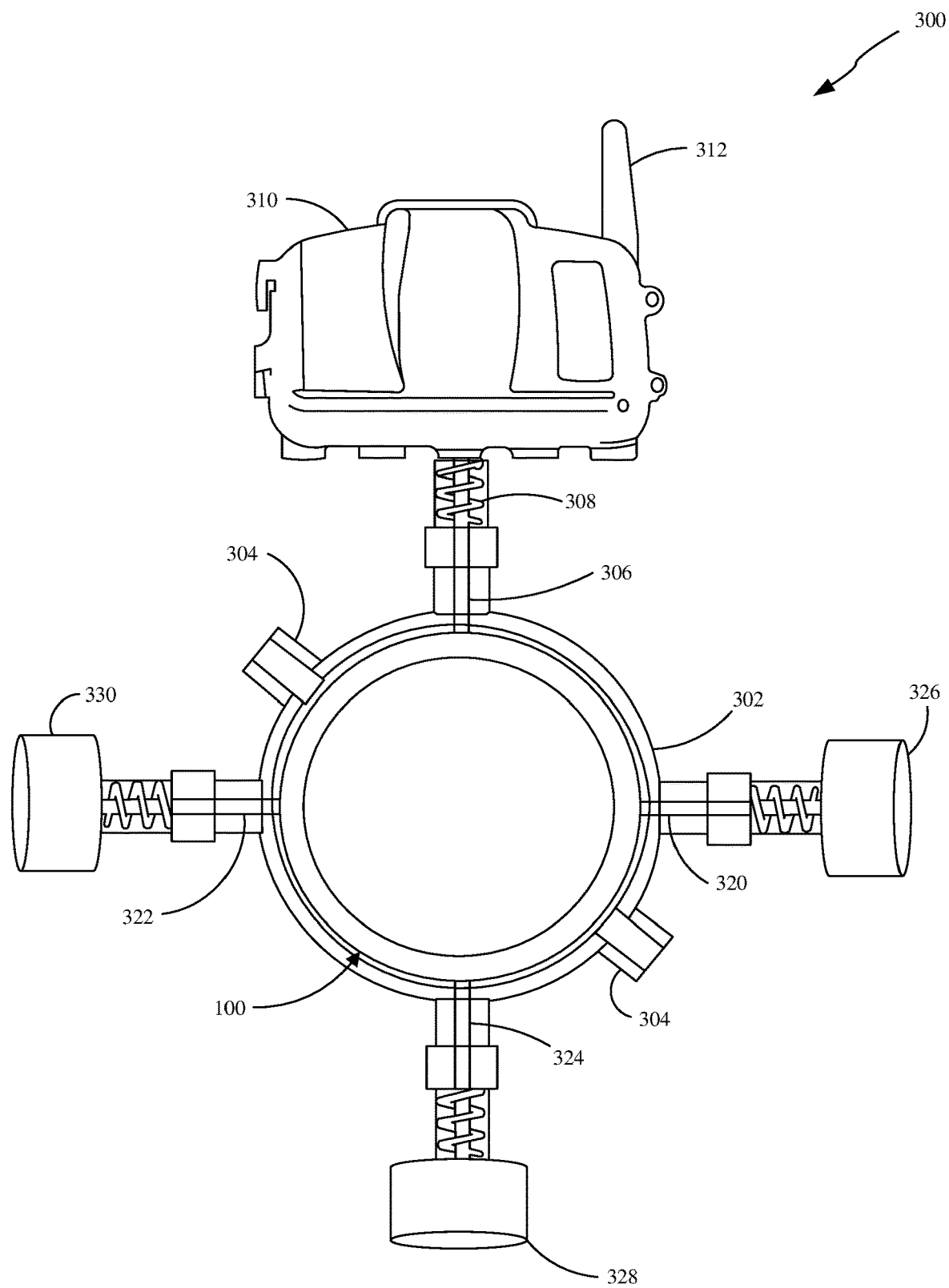
FIG. 3 is a diagrammatic view of a process fluid temperature estimation system in accordance with an embodiment of the present invention.

FIG. 3 is a diagrammatic view of a process fluid temperature estimation system in accordance with an embodiment of the present invention. System 300 bears some similarities to system 200 (shown in FIG. 1) and like components are numbered similarly. In particular, system 300 includes a sensor capsule 306 that is urged into contact with an outer surface of pipe 100 via a spring or other suitable mechanical element 308. Additionally, sensor capsule 306 is electrically coupled to electronics within housing 310 in order to generate a process fluid estimation. However, as shown in FIG. 3, three additional temperature sensor capsules 320, 322, and 324, are positioned at different radial locations about pipe 100, and coupled thereto by clamp 302. In the illustrated example, the four sensor capsules (306, 320, 322, and 324), are disposed at approximately 90° intervals. Accordingly, temperature sensor capsule 306 is positioned on a top surface of pipe 100 while temperature sensor capsule 324 is positioned at a bottom surface thereof. Similarly, sensor capsule 320 is positioned at one side of pipe 100, while sensor capsule 322 is positioned substantially diametrically opposite sensor capsule 320. Each sensor capsule is electrically coupled to measurement circuitry within transmitter housing 310 via respective connection heads, such as connection heads 326, 328, and 330 using wires (not shown) or wireless communication. As can be appreciated, each sensor capsule measures pipe skin temperature at its respective location, and, can be used to generate an estimation of the temperature of the internal surface of pipe 100 that corresponds with the mounting location of the respective sensor capsule. Controller 222 of electronics disposed within transmitter housing 310 is programmed, or otherwise configured, to determine process fluid flow conditions based on differences between the various estimations of internal surface temperature at the different positions. Additionally, as noted above with respect to FIGS. 1 and 2, a reference temperature indication may be provided by a reference temperature sensor disposed within transmitter housing 310, or communicated thereto via process communication, such as through antenna 312, or by coupling to an additional temperature sensor. In one embodiment, a temperature sensor is disposed within transmitter housing 310 proximate a terminal junction and is couple to a measurement circuitry 228.

By placing two or more sensor capsules at different positions about pipe or conduit 100, system 300 can determine if the process fluid is flowing properly for an accurate estimation of temperature of the process fluid to be provided. Additionally, embodiments described herein can also determine if process fluid conduit 100 is only partially filled, and/or whether process fluid is flowing through process fluid conduit 100. These additional indications may be provided locally by system 300 (such as via a local display) or they may be communicated to a remote device, such as via process communication through antenna 312.

In some embodiments, the mounting orientation for the various sensor capsules is important to know before determining what the sensor characteristics mean. In other words, controller 222, within transmitter housing 310, must know that sensor capsule 306 is disposed at a top of process fluid conduit 100, as well as to know that sensor capsule 324 is disposed at a bottom side thereof. Similarly, the controller must also know that sensor capsules 320 and 322 are disposed on opposite sides of the process fluid conduit. With this information, controller 222 can generate indications and/or correct for varying process fluid flow conditions in order to provide a more accurate process fluid temperature estimation. The following are examples of flow conditions and the way that they can be identified by controller 222.

If the gradient across the process fluid produces the highest temperature at the top sensor and the bottom temperature sensor is the lowest, and both side sensors provide substantially the same indication, controller 222 can determine that no process fluid is flowing through process fluid conduit 100. This is because process fluid is in contact with all internal surfaces of the process fluid conduit and since the fluid is not flowing, the warmer fluid will move to the top of the process fluid conduit and the cooler fluid will remain at the bottom. When such profile occurs, controller 222 can provide an indication of a no flow condition relative to the process fluid. Additionally, an average of the temperature of the process fluid can be provided by averaging the top and bottom sensors and comparing that estimation with the estimation provided with the two side sensors. In this example, controller 222 could provide an estimation of process fluid temperature, as well as an additional indication that the process fluid is not flowing.

If the bottom and side sensors all provide nearly equal temperature, but the top sensor (sensor capsule 306) is at a temperature that is between ambient and the values of the side and bottom sensor, then controller 222 can indicate that greater than 50% of the process fluid conduit is filled. Additionally, when this condition occurs, controller 222 can provide an estimation of process fluid temperature based only on the side and bottom sensor capsule values, and may additionally provide an indication that the conduit is filled greater than 50%, but less than 100%.

If the top and side sensors are measured at a temperature that is between ambient and the temperature of the bottom sensor, but the top sensor value is closest to ambient temperature, then controller 222 can indicate that the process fluid conduit is filled less than 50% full. Additionally, an indication of the process fluid temperature can be provided based solely on the temperature from bottom sensor capsule 324, and controller 222 can provide an indication that conduit 100 is filled less than 50% full.

If the top and side sensors are at substantially the same temperature, but bottom sensor capsule 324 registers a different value, then controller 222 can determine that some material is present on the bottom inside surface of the process fluid conduit. Examples of such material can include moisture, sediment, etc. In such instance, the process fluid temperature estimation can be provided based on the top and side sensors only, and the controller 222 can provide an additional indication that material is detected in the bottom inside surface of conduit 100.

Figure 4:
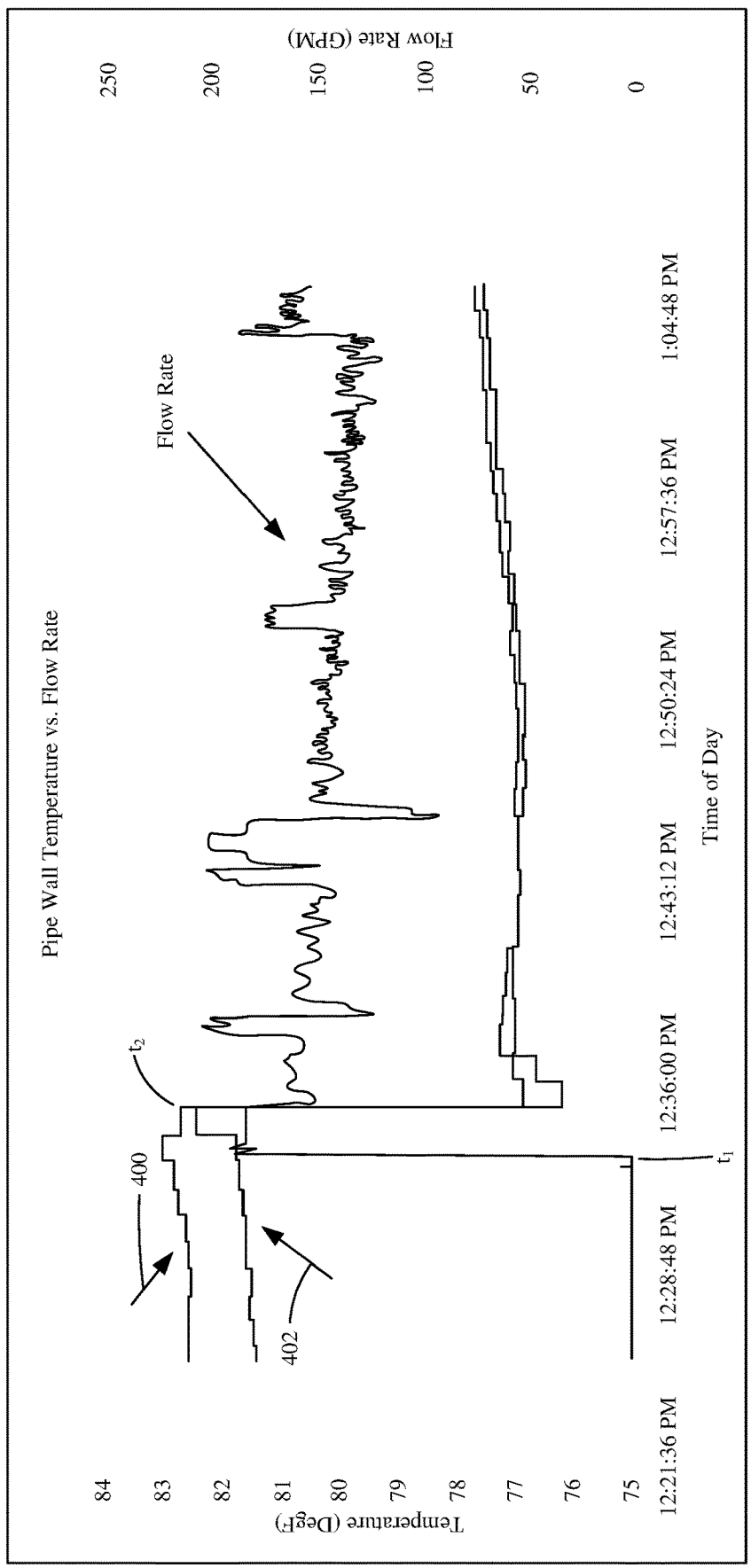
FIG. 4 is a chart showing temperature of different pipe wall locations over time as process fluid flow varies.

FIG. 4 is a chart showing temperature of different pipe wall locations over time as process fluid flow varies. The data shown in FIG. 4 is illustrative of a condition when process fluid is not flowing. The data shows a difference between the side mounted sensor, as illustrated at reference numeral 400, and the data from the bottom-mounted sensor as indicated at reference numeral 402. At time $t_1$, a pump is engaged in order to begin generating process fluid flow. As can be seen, the sensors are exposed to a similar temperature measurement, and their values quickly converge at time $t_2$.

While the embodiment illustrated with respect to FIG. 3 shows multiple sensor capsules coupled to a clamping mechanism and each coupled to respective connection heads, it is expressly contemplated that in other implementations multiple sensor points could be built directly into a clamping mechanism and the various sensor wires could be routed into transmitter housing 310 and coupled to measurement circuitry 228 directly. Additionally, while the embodiments shown with respect to FIG. 3 utilize a total of four sensor capsules, it is also contemplated that some process fluid variation information may be discernable by using three such sensor capsules (top, bottom, and one side sensor capsule). Additionally, it is also expressly contemplated that additional information may be discernable by using more than four sensor capsules. Further still, it is also expressly contemplated that multiple such systems 300 may be located at different longitudinal positions along a process fluid conduit, and that one or both of the controllers within the respective systems may be provided with additional information from the other process fluid estimation system such that variations of temperature flow along the direction of the flow may be analyzed to determine additional process fluid flow conditions and/or corrections in the process fluid estimation system. For example, such information may indicate that process fluid flow is turbulent, laminar, or transitional. Cross-sectional gradients may also be used to detect disturbances to the turbulent flow condition as well as to indicate if the flow is fully developed. Disruptions in the piping such as elbows, valves, or reducers may break up the fully developed turbulent flow. Accurate temperature measurements (as well as flow measurements) often depend on having a fully developed flow condition.

In embodiments that employ additional temperature measurements about the external surface of the process fluid conduit, the linearity of the cross-sectional temperature can be determined. This linearity indication can help detect situations such as scaling, thinning, the presence of sediment, or unwanted water in steam applications and may even provide an indication to take action. This may be important because, in some cases, lack of action may lead to an efficiency impact, pressure build up, or even permanent damage to the process fluid conduit.

Steady state temperature differences, in some cases, may be all that is required to determine actionable states, but by monitoring timing information due to temperature change, a better understanding of a level of scaling or thinning can be provided. Thus, the various process fluid estimations provided by system 300 may be stored by an external device, or stored internally and analyzed over time to identify trends indicative of wear or other deterioration in the system.

While embodiments described thus far have generally contemplated the use of sensor capsules having resistance temperature devices (RTDs) in the sensor capsule, any suitable temperature sensing structures or techniques can be used in accordance with embodiments of the present invention. For example, sensor methods such as fiber optics can provide a technique to provide higher density of temperature measurement points about conduit 100.

Figure 5:
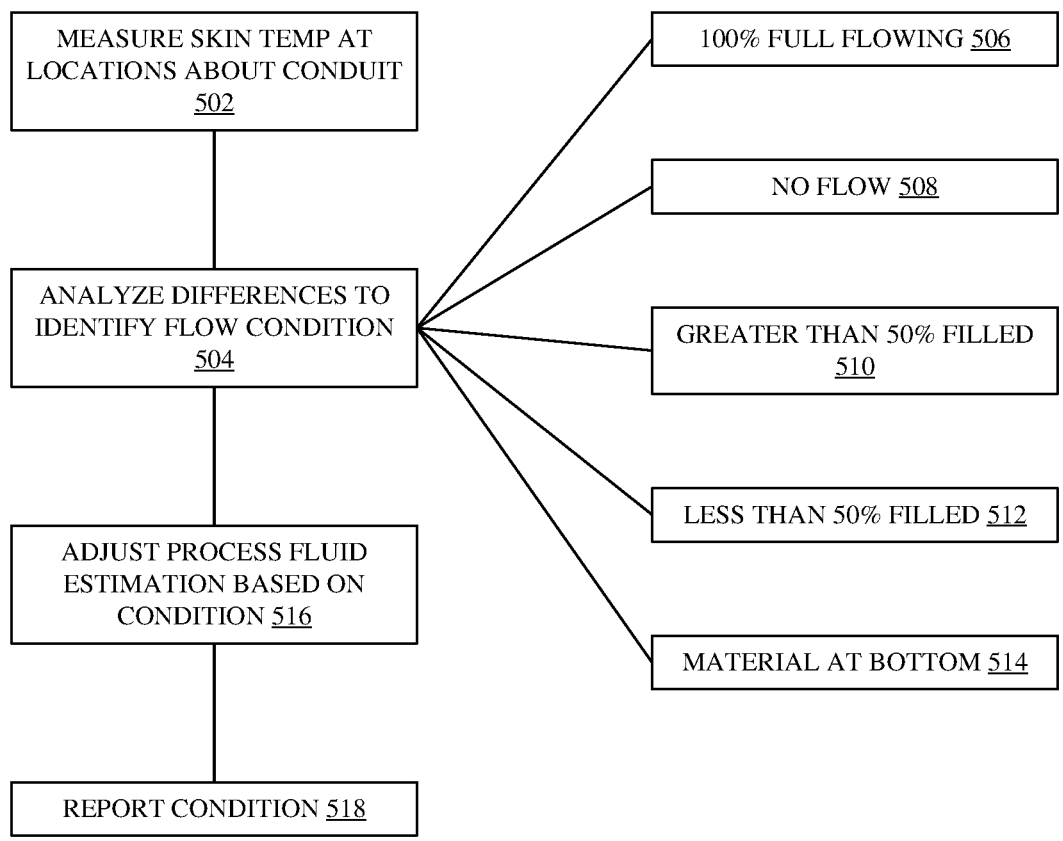
FIG. 5 is a block diagram of a method for estimating process fluid temperature within a flow conduit for various flow conditions in accordance with an embodiment of the present invention.

FIG. 5 is a block diagram of a method for estimating process fluid temperature within a flow conduit for various flow conditions in accordance with an embodiment of the present invention. Method 500 begins at block 502 where the skin temperature is measured at multiple locations about the process fluid conduit. For example, the skin temperature may be measured at top, bottom, and side locations, as described above with respect to FIG. 3. Next, at block 504, any differences between the various temperature measurements are analyzed in order to identify particular flow conditions. Examples of flow conditions, and the differences in measured temperatures that such flow conditions generate have been described above. It is also expressly contemplated that the degree to which measurement differences (or equality) are required can be set as user-selected thresholds, or can be entered programmatically via the manufacturer during the assembly or building of the process fluid temperature estimation system. Examples of various conditions that may be identified based on the differences in the measured temperatures include a 100% full, flowing process fluid conduit, as indicated at reference numeral 506; a no flow condition as indicated at reference numeral 508; a greater than 50% filled, flowing condition, as indicated at reference numeral 510; a less than 50% filled, flowing condition, as indicated at reference numeral 512, and the presence of material at the bottom inside surface of the process fluid conduit as indicated at reference numeral 514. As can be appreciated, if additional sensor capsules are disposed about the process fluid conduit (such as spaced at 45° intervals), then additional levels of process fluid conduit filling (such as 25% and 75%) may also be provided. Next, at block 516, the process fluid flow condition may be provided as an output and/or may be used to adjust or otherwise compensate a process fluid temperature estimate. As described above, in certain instances, the process fluid temperature estimation may be based on data from less than all of the available sensors. For example, if the process conduit is filled less than 50%, then the process fluid estimation will be based solely on the skin temperature as sensed by the bottom sensor capsule (324 as shown in FIG. 3). In contrast, if the process fluid flow condition indicates that material (such as sediment) is disposed proximate the bottom surface of process fluid conduit 100, but that the process fluid conduit is otherwise full, then the process fluid temperature estimation will be based on the top and side sensor capsule measurements, and will omit the value received from the bottom sensor capsule. Accordingly, an adjusted process fluid temperature estimation is provided based on the identified process fluid flow condition. Next, at block 518, the system may optionally report the identified process fluid flow condition.

Although the present invention has been described with reference to preferred embodiments, workers skilled in the art will recognize that changes may be made in form and detail without departing from the spirit and scope of the invention.

What is claimed is:

1. A process fluid flow system comprising:
   a first pipe skin sensor disposed to measure an external temperature of a process fluid conduit at a first location on the process fluid conduit;
   a second pipe skin sensor disposed to measure an external temperature of the process fluid conduit at a second location on the process fluid conduit;
   measurement circuitry coupled to the first and second pipe skin sensors;
   a controller coupled to the measurement circuitry and configured to identify a process fluid flow condition based on signals from the first and second pipe skin sensors and to output an indication of the process fluid flow condition; and
   wherein the controller is configured to obtain a reference temperature measurement having a fixed thermal relationship relative to the first and second pipe skin sensors, the reference temperature measurement being different than the measured external temperature of the process fluid conduit, and wherein the controller is configured to use the process fluid flow output and a heat flow calculation to provide a process fluid temperature estimation output that is adjusted based on the process fluid flow output.

2. The process fluid flow system of claim 1, and further comprising a clamp configured to mount the first and second pipe skin sensors on substantially opposite sides of the process fluid conduit.

3. The process fluid flow system of claim 2, and further comprising a third pipe skin sensor mounted to the clamp between the first and second pipe skin sensors.

4. The process fluid flow system of claim 3, and further comprising a fourth pipe skin sensor mounted to the clamp diametrically opposite the third pipe skin sensor.

5. The process fluid flow system of claim 4, wherein the first, second, third, and fourth pipe skin sensors are spaced about 90 degrees apart about the external surface of the process fluid conduit.

6. The process fluid flow system of claim 1, wherein the controller is configured to provide the process fluid temperature estimate as a local, output.

7. The process fluid flow system of claim 1, wherein the process fluid temperature estimation output is generated using less than all of the first and second sensors based on the process fluid flow condition.

8. The process fluid flow system of claim 1, and further comprising communication circuitry coupled to the controller, and wherein the process fluid temperature estimation output is communicated to remote device.

9. The process fluid flow system of claim 8, wherein the controller is configured to communicate the identified process fluid flow condition to the remote device.

10. The process fluid flow system of claim 1, wherein the process fluid flow condition is a completely full process fluid conduit with process fluid flowing therethrough.

11. The process fluid flow system of claim 1, wherein the process fluid flow condition is a completely full process fluid conduit with no process fluid flow.

12. The process fluid flow system of claim 1, wherein the process fluid flow condition is a greater than 50% full process fluid conduit with process fluid flowing therethrough.

13. The process fluid flow system of claim 1, wherein the process fluid flow condition is a less than 50% full process fluid conduit with process fluid flowing therethrough.

14. The process fluid low system of claim 1, wherein the process fluid flow condition is indicative of material disposed on a bottom surface of the process fluid conduit.

15. A method for estimating a process fluid flow characteristic within a flow conduit, the method comprising:
  obtaining surface temperature measurement at a plurality of locations about an external diameter of the flow conduit;
  analyzing the plurality of surface temperature measurements identity a flow condition within the flow conduit;
  selecting a combination of surface temperature measurements based on the identified flow condition;
  applying a heat flow calculation to the selected combination of surface temperature measurements to generate a process fluid temperature estimate; and
  providing the process fluid temperature estimate as an output.

16. The method of claim 15, wherein analyzing the plurality of surface temperature measurements includes determining whether differences between the surface temperature measurements exceed a predetermined threshold indicative of one of the various flow conditions.

17. The method of claim 16, wherein the predetermined threshold is user-provided.

18. The method claim 15, and further comprising generating an indication of the identified flow condition.

19. The method of claim 18, wherein the indication s provided as a local output.

20. The method of claim 18, wherein the indication is selected from the group consisting of laminar flow, transitional flow, and turbulent flow.

21. A process fluid flow system comprising:
  a first pipe sensor disposed to measure an external temperature of a process fluid conduit at a first location on the process fluid conduit;
  a second pipe skin sensor disposed to measure an external temperature of the process fluid conduit at a second location on the process fluid conduit;
  a third pipe skin sensor disposed to measure an external temperature of the process fluid conduit at a third location on the process fluid conduit;
  a fourth pipe skin sensor disposed to measure an external temperature of the process fluid conduit at a fourth location on the process fluid conduit;
  wherein the first, second, third, and fourth pipe skin sensors are spaced about 90° apart about the external surface of the process fluid conduit;
  measurement circuitry coupled to the first, second, third, and fourth pipe skin sensors; and
  a controller coupled to the measurement circuitry and configured to identify a process fluid flow condition based on signals from the first, second, third, and fourth pipe skin sensors and to output an indication of the process fluid flow condition.

22. The process fluid flow system of claim 21, and further comprising a clamp configured to mount the first and second pipe skin sensors on substantially opposite sides of the process fluid conduit.

23. The process fluid flow system of claim 21, wherein the process fluid flow condition is selected from the group consisting of: full process fluid conduit with process fluid flowing therethrough, full process fluid conduit with no process fluid flow, greater than 50% full process fluid conduit with process fluid flowing therethrough, and less than 50% full process fluid conduit with process fluid flowing therethrough.

24. The process fluid flow system of claim 21, wherein the process fluid flow condition is indicative of material disposed on a bottom surface of the process fluid conduit.

* * * * *